(12) United States Patent
Ikeda et al.

(10) Patent No.: US 12,110,835 B2
(45) Date of Patent: Oct. 8, 2024

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yuto Ikeda, Okazaki (JP); Ryota Sugiyama, Nagoya (JP); Takanobu Gotoh, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/193,702

(22) Filed: Mar. 31, 2023

(65) Prior Publication Data

US 2023/0323831 A1 Oct. 12, 2023

(30) Foreign Application Priority Data

Apr. 12, 2022 (JP) .................. 2022-065835

(51) Int. Cl.
*F02D 41/40* (2006.01)
*F02D 41/00* (2006.01)
*F02D 41/38* (2006.01)

(52) U.S. Cl.
CPC ....... *F02D 41/402* (2013.01); *F02D 41/0087* (2013.01); *F02D 2041/389* (2013.01); *F02D 2200/0802* (2013.01)

(58) Field of Classification Search
CPC .............. F02D 41/402; F02D 41/0087; F02D 2041/389; F02D 2200/0802; F02D 41/401
See application file for complete search history.

(56) References Cited

U.S. PATENT DOCUMENTS

| | | | | |
|---|---|---|---|---|
| 2015/0051809 | A1* | 2/2015 | Glugla | F02D 41/005 |
| | | | | 123/406.12 |
| 2016/0115878 | A1* | 4/2016 | VanDerWege | F02D 41/0087 |
| | | | | 123/333 |
| 2019/0218953 | A1* | 7/2019 | Di Martino | F02D 41/029 |
| 2021/0107452 | A1 | 4/2021 | Nose et al. | |

FOREIGN PATENT DOCUMENTS

| | | |
|---|---|---|
| JP | H05-302507 A | 11/1993 |
| JP | 2001-059432 A | 3/2001 |
| JP | 2010-196659 A | 9/2010 |
| JP | 2010-236398 A | 10/2010 |
| JP | 2016-3576 A | 1/2016 |
| JP | 2021-60027 A | 4/2021 |

* cited by examiner

*Primary Examiner* — Syed O Hasan
(74) *Attorney, Agent, or Firm* — Oblon, McClelland, Maier & Neustadt, L.L.P.

(57) ABSTRACT

A controller is configured to control an internal combustion engine. The internal combustion engine may execute multi-shot injection and single-shot injection and execute a deactivating process that stops supplying fuel to at least one of cylinders and supplies fuel to the remaining cylinders. The controller is configured to execute, when terminating the deactivating process to restart supplying fuel to a deactivated cylinder in which supply of fuel is stopped, a retarding process that executes a first fuel injection through the single-shot injection and retards a fuel injection start timing as compared to when executing the multi-shot injection.

8 Claims, 6 Drawing Sheets

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

Japanese Laid-Open Patent Publication No. 2021-060027 discloses a hybrid electric vehicle including an engine with cylinders and a motor generator. The hybrid electric vehicle includes an exhaust purifying device that purifies exhaust gas discharged out of the cylinders. The exhaust purifying device includes a catalyst that purifies exhaust gas at an activation temperature. Thus, in the hybrid electric vehicle, when the temperature of the catalyst is relatively low, the catalyst is warmed up to heat the catalyst to the activation temperature.

When the catalyst needs to be warmed up, the controller for the hybrid electric vehicle executes a deactivating process that stops supplying fuel to at least one of the cylinders of the engine and supplies oxygen to the remaining cylinders. Thus, the exhaust purifying device is supplied with oxygen through the cylinder (deactivated cylinder) in which the supply of fuel is stopped. Thus, the oxidization in the catalyst is expedited to increase the temperature of the catalyst. In such a manner, the controller can expedite the catalyst warm-up by supplying oxygen through the deactivating process.

Japanese Laid-Open Patent Publication No. 2016-003576 discloses a controller that performs fuel injection in the deactivated cylinder when restarting the supply of fuel. The fuel injection is split into two or more injections. As the temperature in the cylinder becomes lower, the controller performs a larger number of injections.

The supply of fuel cannot be immediately restarted in a case in which the timing at which the deactivating process was terminated and it was determined to restart supplying fuel to the deactivated cylinder is later than a fuel injection start timing of the deactivated cylinder. That is, combustion is restarted in a combustion stroke subsequent to one cycle in the deactivated cylinder. Thus, when the deactivating process is terminated so that normal operation in which combustion is performed in all the cylinders resumes, the restarting of combustion in the deactivated cylinder may be delayed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine. The internal combustion engine in which the controller is employed is configured to execute multi-shot injection in which injection of fuel by an amount requested in a single combustion cycle is split into two or more injections and single-shot injection in which fuel is injected once by the amount requested in the single combustion cycle. The internal combustion engine is configured to execute a deactivating process that stops supplying fuel to at least one of the cylinders and supplies fuel to the remaining cylinders. The controller is configured to execute, when terminating the deactivating process to restart supplying fuel to a deactivated cylinder in which supply of fuel is stopped, a retarding process that executes a first fuel injection through the single-shot injection and retards a fuel injection start timing as compared to when executing the multi-shot injection.

When the multi-shot injection is executed, there is a suspension period during which the injection is suspended between the split injections. Thus, the execution of the multi-shot injection takes a longer period of time to inject the same amount of fuel than the execution of the single-shot injection.

Thus, by executing the retarding process, the above controller executes the first fuel injection in the deactivated cylinder through the single-shot injection when restarting the supply of fuel. The controller executes the retarding process to retard the fuel injection start timing of the first fuel injection in the deactivated cylinder as compared to when the multi-shot injection is performed. This prevents the timing at which the deactivating process was terminated and it was determined to restart supplying fuel to the deactivated cylinder, in which the supply of fuel was stopped, from being later than the fuel injection start timing of the deactivated cylinder. Accordingly, when terminating the deactivating process, the controller allows for quick resuming of normal operation in which combustion is performed in all the cylinders.

In the above aspect, the retarding process includes changing fuel injection modes in all the cylinders in which the deactivating process is being executed to the single-shot injection.

If the fuel injection modes of multiple cylinders are individually controlled, fuel injection would be controlled in a complicated manner. In this regard, the above controller can execute the retarding process. In the retarding process, the fuel injection modes of all the cylinders in which the deactivating process is being executed are changed to the single-shot injection, thereby performing the first fuel injection through the single-shot injection in the deactivated cylinder. This allows the retarding process to be executed with a less complicated fuel injection control.

In the above aspect, the retarding process includes retarding, from a fuel injection start timing of a cylinder other than the deactivated cylinder, the fuel injection start timing of the first fuel injection to restart supplying fuel to the deactivated cylinder.

As the fuel injection start timing is set to be more retarded, the timing at which it was determined to restart supplying fuel to the deactivated cylinder is prevented from being later than the fuel injection start timing of the deactivated cylinder. That is, as the fuel injection start timing is set to be more retarded, resumption of normal operation is prevented from being delayed. However, since there is a fuel injection start timing suitable for combustion, unnecessary retardation of the fuel injection start timing is not preferred. In this regard, the above controller retards only the fuel injection start timing of the first fuel injection to restart supplying fuel to the deactivated cylinder from the fuel injection start timing of a cylinder other than the deactivated cylinder. This prevents the resumption of normal operation from being delayed, while maximally performing fuel injection at a time suitable for combustion.

In the above aspect, the retarding process includes changing, to the single-shot injection, only the first fuel injection when terminating the deactivating process to restart supplying fuel to the deactivated cylinder in which the supply of fuel is stopped.

Since there is a fuel injection mode for combustion, an unnecessary change in the fuel injection mode is not preferred. In this regard, the above controller changes, to the single-shot injection, only the first fuel injection to restart supplying fuel to the deactivated cylinder. This prevents the resumption of normal operation from being delayed, while maximally performing fuel injection in the fuel injection mode suitable for combustion.

In the above aspect, the internal combustion engine further includes an exhaust passage and an exhaust purifying device disposed in the exhaust passage, and the controller is configured to execute the retarding process and terminate the deactivating process when determining that a temperature of the exhaust purifying device is greater than or equal to a specified temperature during execution of the deactivating process.

During the execution of the deactivating process, the oxygen that has passed through the deactivated cylinder is supplied to the exhaust purifying device through the exhaust passage. This expedites the oxidation in the exhaust purifying device, thereby increasing the temperature of the exhaust purifying device. To prevent overheating of the exhaust purifying device, the supply of oxygen to the exhaust purifying device needs to be stopped by terminating the deactivating process when the temperature of the exhaust purifying device is greater than or equal to the specified temperature. However, if the resumption of normal operation is delayed, the supply of oxygen continues so that the exhaust purifying device is overheated. Such overheating of the exhaust purifying device is prevented by the above controller.

In the above aspect, the internal combustion engine further includes an exhaust passage and a filter disposed in the exhaust passage, and the controller is configured to execute the retarding process and terminate the deactivating process when determining that a deposition amount of particulate matter in the filter is greater than or equal to a specified amount and a temperature of the filter is greater than or equal to a specified temperature during execution of the deactivating process.

During the execution of the deactivating process, the oxygen that has passed through the deactivated cylinder is supplied to the filter through the exhaust passage. Thus, the combustion of particulate matter deposited in the filter increases the temperature of the filter. If the supply of oxygen continues with a relatively large amount of particulate matter deposited in the filter, heat of combustion causes the particulate matter to burn in a successive manner, thereby overheating the filter. To prevent overheating of the filter, the supply of oxygen to the filter needs to be stopped by terminating the deactivating process when the filter temperature is greater than or equal to the specified temperature in a state in which the deposition amount is greater than or equal to the specified amount. However, if the resumption of normal operation is delayed, the supply of oxygen continues so that the filter is overheated. Such overheating of the filter is prevented by the above controller.

In the above aspect, the internal combustion engine includes a port injection valve that injects fuel into an intake port and a direct injection valve that injects fuel into each of the cylinders. The internal combustion engine is configured to execute port injection that is fuel injection performed by the port injection valve and direct injection that is fuel injection performed by the direct injection valve. The controller is configured to execute, when terminating the deactivating process to restart supplying fuel to the deactivated cylinder in which the supply of fuel is stopped, the retarding process that executes the first fuel injection through the direct injection with the single-shot injection and retards the fuel injection start timing as compared to when executing the direct injection with the multi-shot injection.

To execute port injection, fuel injection needs to be completed during the intake stroke (i.e., by the time the intake valves close). To execute direct injection, fuel can be supplied to the cylinders even in the compression stroke after the intake valves close. However, when direct injection is performed through the multi-shot injection, there is a suspension period during which injection is suspended between the split injections. Thus, the multi-shot injection takes a longer period of time to inject the same amount of fuel than the single-shot injection.

Thus, by executing the retarding process, the above controller executes the first fuel injection in the deactivated cylinder through direct injection with the single-shot injection when restarting the supply of fuel. The controller executes the retarding process to retard the fuel injection start timing of the first fuel injection in the deactivated cylinder as compared to when direct injection with the multi-shot injection is performed. This prevents the timing at which the deactivating process was terminated and it was determined to restart supplying fuel to the deactivated cylinder, in which the supply of fuel was stopped, from being later than the fuel injection start timing of the deactivated cylinder. Accordingly, when terminating the deactivating process, the controller allows for quick resuming of normal operation in which combustion is performed in all the cylinders.

Another aspect of the present disclosure provides a method for controlling an internal combustion engine. The internal combustion engine is configured to execute multi-shot injection in which injection of fuel by an amount requested in a single combustion cycle is split into two or more injections and single-shot injection in which fuel is injected once by the amount requested in the single combustion cycle. The internal combustion engine is configured to execute a deactivating process that stops supplying fuel to at least one of the cylinders and supplies fuel to the remaining cylinders. The method includes executing, when terminating the deactivating process to restart supplying fuel to a deactivated cylinder in which supply of fuel is stopped, a first fuel injection through the single-shot injection and retarding a fuel injection start timing as compared to when executing the multi-shot injection.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An engine control unit 110 that is a controller for an internal combustion engine according to an embodiment will now be described with reference to FIGS. 1 to 6.

Configuration of Vehicle

Figure 1:
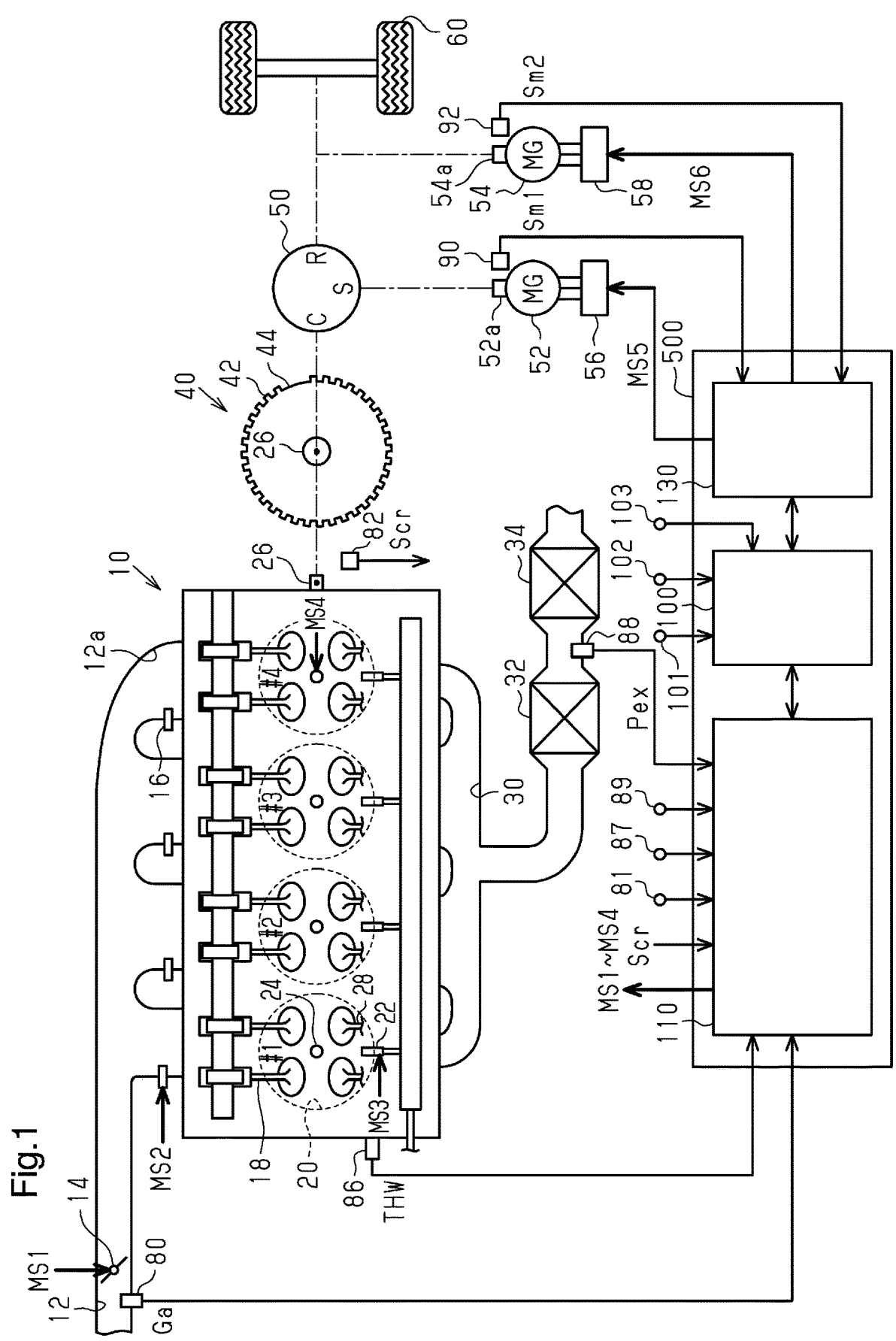
FIG. 1 is a schematic diagram showing the configuration of a hybrid electric vehicle including an engine control unit according to an embodiment of a controller for an internal combustion engine and including an engine controlled by the engine control unit.

As shown in FIG. 1, an engine 10 includes four cylinders #1 to #4. The engine 10 includes an intake passage 12 provided with a throttle valve 14. The downstream portion of the intake passage 12 includes intake ports 12a. The intake ports 12a respectively include four port injection valves 16, each injecting fuel into a corresponding intake port 12a. The air drawn into the intake passage 12 and the fuel injected from the port injection valves 16 flow into combustion chambers 20 as intake valves 18 open. The engine 10 further includes four direct injection valves 22, each injecting fuel into a corresponding one of the cylinders #1 to #4. Fuel may be injected from the direct injection valves 22 into the combustion chamber 20. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes, as an exhaust purifying device, a three-way catalyst 32 that stores oxygen and a gasoline particulate filter (GPF) 34. In the GPF 34 of the present embodiment, a three-way catalyst is supported by a filter that traps particulate matter (PM).

A crank rotor 40 with teeth 42 is coupled to the crankshaft 26. Generally, the crank rotor 40 includes thirty-two teeth 42, each located at an interval of 10° C.A. Thus, since two teeth 42 are missing in the crank rotor 40, the crank rotor 40 includes a tooth missing portion 44. In the tooth missing portion 44, the interval between adjacent ones of the teeth 42 is relatively large. The tooth missing portion 44 indicates a reference rotation angle of the crankshaft 26.

The crankshaft 26 is mechanically coupled to a carrier C of a planetary gear mechanism 50, which is included in a power split device. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54.

Controller 500

A controller 500 controls the engine 10, the first motor generator 52, and the second motor generator 54. The controller 500 includes the engine control unit 110, which controls the engine 10. The controller 500 also includes a motor control unit 130 that controls the first motor generator 52 and the second motor generator 54. The controller 500 further includes a central control unit 100 that is connected to the engine control unit 110 and the motor control unit 130 to centrally control the vehicle. These control units 100, 110, 130 each include processing circuitry and a memory that stores programs executed by the processing circuitry.

Since the controller 500 controls the engine 10, the first motor generator 52, and the second motor generator 54, the controller 500 controls the powertrain of the vehicle. The controller 500 receives a detection signal from a sensor disposed in each component of the vehicle.

The engine control unit 110 operates operation parts of the engine 10, such as the throttle valve 14, the port injection valves 16, the direct injection valves 22, and the ignition plugs 24 to control parameters such as torque and exhaust component ratio, which are controlled variables of the engine 10.

Further, the motor control unit 130 operates the inverter 56 to control a rotation speed, which is a controlled variable of the first motor generator 52. Furthermore, the motor control unit 130 operates the inverter 58 to control torque, which is a controlled variable of the second motor generator 54.

FIG. 1 shows operation signals MS1 to MS6 that correspond to the throttle valve 14, the port injection valves 16, the direct injection valves 22, the ignition plugs 24, the inverter 56, and the inverter 58, respectively. To control the controlled variables of the engine 10, the engine control unit 110 refers to an intake air amount Ga detected by an air flow meter 80. Further, the engine control unit 110 refers to an output signal Scr of the crank angle sensor 82, a coolant temperature THW detected by a coolant temperature sensor 86, and a pressure Pex of exhaust gas that flows into the GPF 34. The pressure Pex is detected by an exhaust pressure sensor 88. To control the controlled variables of the first motor generator 52, the motor control unit 130 refers to an output signal Sm1 of a first rotation angle sensor 90 that detects the rotation angle of the first motor generator 52. To control the controlled variables of the second motor generator 54, the motor control unit 130 refers to an output signal Sm2 of a second rotation angle sensor 92 that detects the rotation angle of the second motor generator 54.

The engine control unit 110 and the motor control unit 130 are each connected to the central control unit 100 by a communication cable. The central control unit 100, the motor control unit 130, and the engine control unit 110 share and exchange the information based on the detection signals received from the sensors and the calculated information through controller area network (CAN) communication.

An accelerator position sensor 101, a braking sensor 102, and a vehicle speed sensor 103 are connected to the central control unit 100. The accelerator position sensor 101 detects the depression amount of the accelerator pedal (i.e., the open degree of the throttle valve 14). The braking sensor 102 detects the operation amount of the brake. The vehicle speed sensor 103 detects the vehicle speed.

The exhaust passage 30 includes an air-fuel ratio sensor 81. The air-fuel ratio sensor 81 is connected to the engine control unit 110. The air-fuel ratio sensor 81 detects the air-fuel ratio.

An upstream temperature sensor 87 is connected to the engine control unit 110 to detect the temperature of exhaust gas flowing between the three-way catalyst 32 and the GPF 34 of the exhaust passage 30. Further, a downstream temperature sensor 89 is connected to the engine control unit 110 to detect the temperature of exhaust gas flowing downstream of the GPF 34.

The engine control unit 110 estimates a catalyst temperature and a GPF temperature based on an engine load factor KL, an engine rotation speed NE, and the temperatures of exhaust gas detected by the upstream temperature sensor 87 and the downstream temperature sensor 89. The catalyst temperature is the temperature of the three-way catalyst 32. The GPF temperature is the temperature of the GPF 34.

The engine control unit 110 calculates a counter CNT, which is a value equivalent to a crank angle, by counting the number of times the output signal Scr of the crank angle sensor 82 has been received. The value of the counter CNT corresponds to the crank angle. As the value of the counter CNT becomes larger, it indicates that the crank angle becomes larger. When the value of the counter CNT corresponds to 720° C.A (i.e., 0° C.A), the counter CNT is reset to 0. The crank angle obtained when the counter CNT is 0 is a crank angle at compression top dead center.

Fuel Injection Mode

Based on the engine load factor KL and the engine rotation speed NE, the engine control unit 110 changes the mode of fuel injection in the engine 10. For example, the engine 10 supplies fuel only through direct injection, which is fuel injection performed by the direct injection valves 22, in a high-load region. The engine 10 supplies fuel only through port injection, which is fuel injection performed by the port injection valves 16, in a low-load region. The engine 10 may supply fuel through port injection and direct injection. In this case, the engine control unit 110 changes the ratio of port injection and direct injection based on the engine load factor KL and the engine rotation speed NE. The engine control unit 110 can select single-shot injection and multi-shot injection as the injection mode of direct injection. The multi-shot injection is an injection mode in which the injection of fuel by an amount requested in a single combustion cycle is split into two or more injections. The single-shot injection is an injection mode in which fuel is injected once by the amount requested in a single combustion cycle. The multi-shot injection is performed to evenly burn the air-fuel mixture. To form an even air-fuel mixture in a cylinder, the engine control unit 110 executes the multi-shot injection as necessary. For example, since it is difficult to form an even air-fuel mixture when the engine is started, the engine control unit 110 executes direct injection with the multi-shot injection. Further, the engine control unit 110 determines whether to execute the multi-shot injection or the single-shot injection based on the engine load factor KL and the engine rotation speed NE. For example, when the engine load factor KL is relatively high, the engine control unit 110 executes the multi-shot injection. When the engine load factor KL is relatively low, the engine control unit 110 executes the single-shot injection. By changing the fuel injection mode depending on situations in this manner, the engine 10 forms an air-fuel mixture suitable for such combustion. Additionally, the injection mode executed by the engine control unit 110 is common for all the cylinders. That is, the engine control unit 110 collectively switches the injection modes of the cylinders, instead of adjusting the injection modes individually.

The engine rotation speed NE is calculated by the engine control unit 110 based on the output signal Scr. The engine load factor KL is calculated by the engine control unit 110 based on the intake air amount Ga and the engine rotation speed NE.

Regenerating Process

Figure 2:
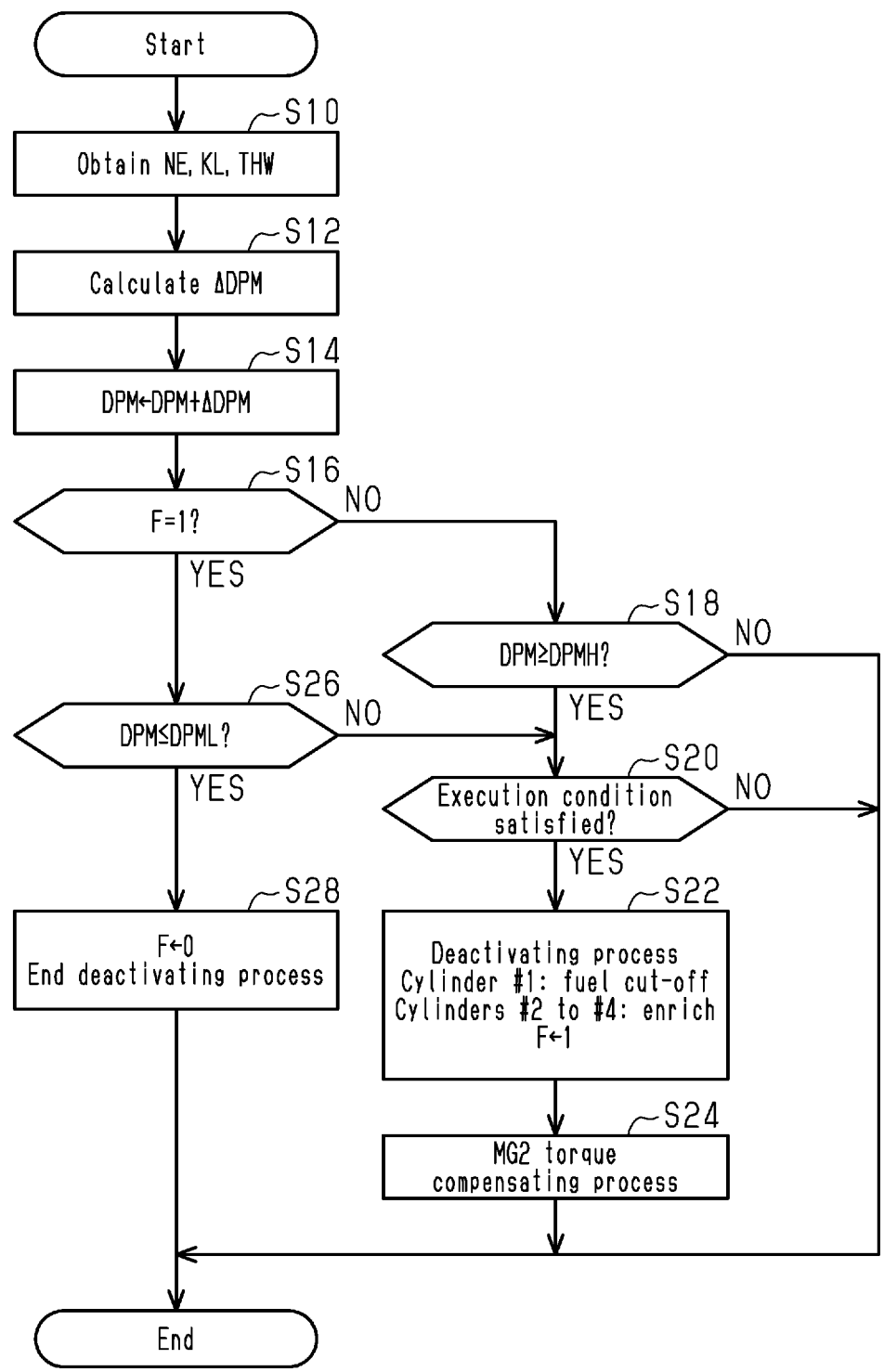
FIG. 2 is a flowchart illustrating the flow of processes in a routine of the deactivating process.

FIG. 2 shows the procedure of a routine of the regenerating process executed by the engine control unit 110. The routine of FIG. 2 is executed by the processing circuitry of the engine control unit 110 repeatedly executing programs stored in the memory, for example, in a predetermined cycle. In the following description, the number of each step is represented by the letter S followed by a numeral.

In the routine of FIG. 2, the engine control unit 110 first obtains the engine rotation speed NE, the engine load factor KL, and the coolant temperature THW (S10). Next, the engine control unit 110 uses the engine rotation speed NE, the engine load factor KL, and the coolant temperature THW to calculate an update amount ΔDPM of a deposition amount DPM (S12). The deposition amount DPM is the amount of PM trapped by the GPF 34. Specifically, the engine control unit 110 calculates the engine rotation speed NE, the engine load factor KL, and the coolant temperature THW to calculate the amount of PM in the exhaust gas discharged to the exhaust passage 30. Then, the engine control unit 110 uses the amount of PM in the exhaust gas and the GPF temperature to calculate the update amount ΔDPM.

Subsequently, the engine control unit 110 sets the sum of the update amount ΔDPM and the deposition amount DPM to a new deposition amount DPM. The engine control unit 110 updates the deposition amount DPM in this manner (S14). Next, the engine control unit 110 determines whether the flag F is 1 (S16). When the flag F is 1, it indicates that a regenerating process is being executed to burn and remove the PM in the GPF 34. When the flag F is 0, it indicates that the regenerating process is not being executed. When determining that the flag F is 0 (S16: NO), the engine control unit 110 determines whether the deposition amount DPM is greater than or equal to a regeneration execution value DPMH (S18). The regeneration execution value DPMH is a threshold value used to determine that PM needs to be removed based on the deposition amount DPM being greater than or equal to the regeneration execution value DPMH.

When determining that the deposition amount DPM is greater than or equal to the regeneration execution value DPMH (S18: YES), the engine control unit 110 determines whether the condition for executing the regenerating process is satisfied (S20). The execution condition is that the following conditions (1) to (3) are all satisfied.

Condition (1): An engine torque command value Te* (a command value of torque for the engine 10) is greater than or equal to a predetermined value Teth.
Condition (2): The engine rotation speed NE is greater than or equal to a predetermined speed.
Condition (3): The torque compensating process of S24 can be executed.

When determining that the conditions (1) to (3) are all satisfied (S20: YES), the engine control unit 110 executes the regenerating process and substitutes 1 into the flag F (S22). In other words, the engine control unit 110 stops injecting fuel from the port injection valve 16 and the direct injection valve 22 of cylinder #1. Further, the engine control unit 110 sets the air-fuel ratio of the air-fuel mixture in the combustion chambers 20 of cylinders #2 to #4 to be richer than the stoichiometric air-fuel ratio. Specifically, the regenerating process is a deactivating process that stops supplying fuel to one of the cylinders (deactivated cylinder) and supplies fuel to the remaining cylinders. This process causes oxygen and unburned fuel to be discharged to the exhaust passage 30 to increase the temperature of the GPF 34, thereby burning and removing the PM trapped by the GPF 34. More specifically, the engine control unit 110 causes oxygen and unburned fuel to be discharged to the exhaust passage 30 to burn the unburned fuel in the three-way catalyst 32 and the like and thus increase the temperature of the exhaust gas. Consequently, the temperature of the GPF 34 increases. In addition, the supplying of oxygen to the GPF 34 allows the PM trapped by the GPF 34 to be burned and removed.

The cylinder in which the supply of fuel is stopped is not limited to cylinder #1. For example, the cylinder in which the supply of fuel is stopped may be switched in sequence such that the number of times the supply of fuel is stopped does not greatly vary between the cylinders.

Next, the engine control unit 110 requests the motor control unit 130 to execute a process that compensates for torque variations in the crankshaft 26 of the engine 10 resulting from the stop of combustion control of cylinder #1 (S24). Upon receipt of the request, the motor control unit 130 superimposes a compensation torque on the torque of traveling requested for the second motor generator 54. The motor control unit 130 operates the inverter 58 based on the requested torque on which the compensation torque is superimposed.

The condition for executing the torque compensating process includes, for example, a condition in which the second motor generator 54 has no anomaly and a condition in which the electric power needed to execute the torque compensating process is stored in a battery.

When determining that the flag F is 1 (S16: YES), the engine control unit 110 determines whether the deposition amount DPM is less than or equal to a deactivation threshold value DPML (S26). The deactivation threshold value DPML is used to determine that the regenerating process can be stopped based on the deposition amount DPM being less than or equal to the deactivation threshold value DPML. When determining that the deposition amount DPM is less than or equal to the deactivation threshold value DPML (S26: YES), the engine control unit 110 stops the regenerating process to substitute 0 into the flag F (S28). That is, the engine control unit 110 terminates the deactivating process.

When completing the process of S24 or S28, or when making a negative determination in the process of S18 or S20, the engine control unit 110 temporarily ends the routine of FIG. 2.

Delay of Restarting of Combustion in Deactivated Cylinder when Deactivating Process is Terminated The timing at which it was determined to terminate the deactivating process (i.e., the timing at which it was determined to restart supplying fuel to the deactivated cylinder, in which the supply of fuel is stopped) may be later than a fuel injection start timing of the deactivated cylinder. In this case, since the supply of fuel cannot be immediately restarted, the restarting of combustion will be delayed.

Such a delay of restarting of combustion will now be described with reference to FIG. 3.

Figure 3:
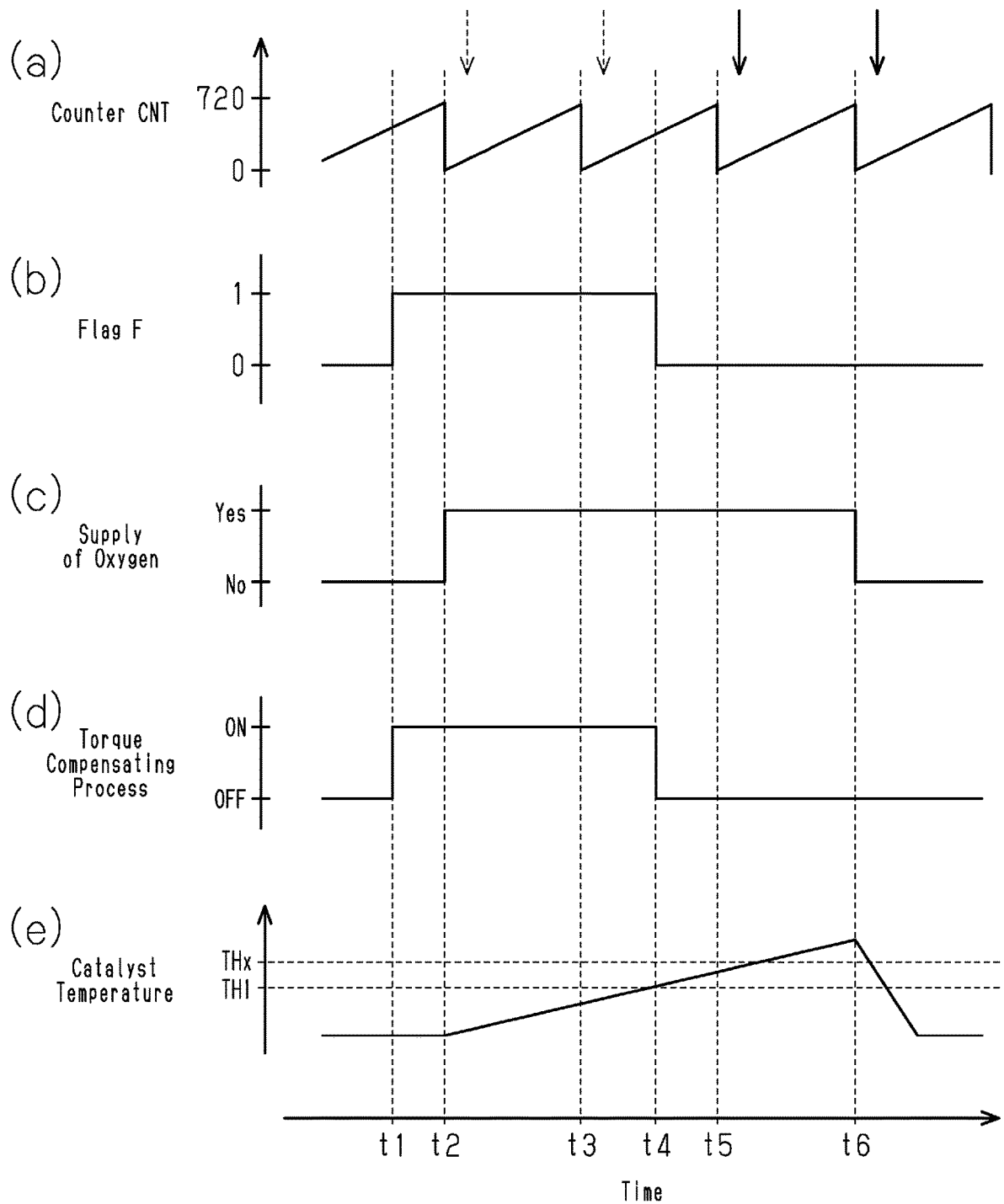
FIG. 3 is a timing diagram illustrating changes in each state that occur in a case in which a conventional engine control unit terminates the deactivating process when an immediate resuming condition is satisfied, in which section (a) illustrates changes in the counter CNT, section (b) illustrates changes in the flag F, section (c) illustrates changes in the supply of oxygen, section (d) illustrates changes in the torque compensating process, and section (e) illustrates changes in the catalyst temperature.

FIG. 3 illustrates an example of terminating the deactivating process from a state in which the deactivating process is being executed with port injection selected.

As illustrated in section (b) of FIG. 3, at time t1, the flag F is updated from 0 to 1 to start the deactivating process in the example of FIG. 3. Section (a) of FIG. 3 illustrates changes in the counter CNT, which indicates the crank angle of the deactivated cylinder. As described above, the crank angle obtained when the counter CNT is 0 is a crank angle at compression top dead center of the deactivated cylinder. The downward arrows each indicate the fuel injection start timing of port injection. The solid arrows each indicate that fuel is injected. The broken arrows each indicate that the supply of fuel is stopped by the deactivating process.

As illustrated in section (b) of FIG. 3, at time t1, the flag F is updated to 1 to start the deactivating process. This causes the torque compensating process to be started from time t1 as illustrated in section (d) of FIG. 3. The fuel injection at this time is performed through port injection. Thus, as illustrated in section (a) of FIG. 3, the first fuel injection start timing subsequent to time t1 falls within the expansion stroke in a period from time t2 to time t3.

Section (c) of FIG. 3 illustrates changes in whether or not fuel is supplied to the exhaust passage 30 through the deactivating process. As described above, during the execution of the deactivating process, oxygen is supplied to the exhaust passage 30 through the deactivated cylinder, in which the supply of fuel is stopped. In section (c) of FIG. 3, "Yes" and "No" of the supply of oxygen respectively indicate whether or not oxygen is supplied through the deactivating process. Here, 720° C.A is one cycle. Section (c) illustrates "Yes" and "No" of the supply of oxygen through the deactivating process in each cycle.

As illustrated in section (c) of FIG. 3, the supply of fuel is stopped in a period from time t2 to time t3, during which the first fuel injection start timing is reached after the deactivating process starts at time t1. The deactivated cylinder is filled with air-fuel mixture during this period because fuel injection was already performed during the last period. However, since the deactivating process was started at time t1, ignition in the deactivated cylinder is not performed during the period from time t2 to time t3. Thus, the air-fuel mixture is left unburned and discharged to the exhaust passage 30. This results in the supply of oxygen. After the supply of oxygen is started, the catalyst temperature starts to rise as illustrated in section (e) of FIG. 3. A limit temperature THx in section (e) of FIG. 3 is an upper limit value of an allowable temperature of the three-way catalyst 32. If the catalyst temperature is higher than the limit temperature THx, the three-way catalyst 32 may be damaged. To solve this problem, when the catalyst temperature is greater than or equal to a first specified temperature TH1, which is lower than the limit temperature THx, the engine control unit 110 requests that the deactivating process be terminated and the supply of oxygen be stopped.

In the example of FIG. 3, as illustrated in section (e) of FIG. 3, the catalyst temperature reaches the first specified temperature TH1 at time t4. Thus, as illustrated in section (b) of FIG. 3, the flag F is changed from 1 to 0 to terminate the deactivating process at time t4. However, at time t4, the fuel injection start timing in the period from time t3 to time t5 has already passed. Thus, the cylinder is not filled with fuel that is to be burned in the combustion stroke during the period from time t5 to time t6. Accordingly, combustion operation cannot resume during the period from time t5 to time t6. Further, as illustrated in section (c) of FIG. 3, the supply of oxygen continues during the period from time t5 to time t6. Consequently, as illustrated in section (e) of FIG. 3, subsequent to time t4, the catalyst temperature continues to rise beyond the limit temperature THx, thereby overheating the three-way catalyst 32.

In the example of FIG. 3, after the deactivating process is terminated at time t4, the fuel injection is restarted in the deactivated cylinder for the first time in the expansion stroke during the period from time t5 to time t6, as illustrated by the downward solid arrows in section (a) of FIG. 3. Thus, as illustrated in section (c) of FIG. 3, combustion operation resumes in the deactivated cylinder and the supply of oxygen is stopped in the period from time t6.

Thus, in the deactivated cylinder, combustion is restarted in the combustion stroke in a cycle subsequent to the cycle in which the termination of the deactivating process was determined. When the deactivating process is terminated so that normal operation in which combustion is performed in all the cylinders resumes, the restarting of combustion in the deactivated cylinder may be delayed.

Further, whereas the torque compensating process is stopped at time t4 as illustrated in section (d) of FIG. 3, combustion operation resumes in the deactivated cylinder in the period from time t6 as described above. Thus, torque variations caused by the deactivating process cannot be compensated for by the torque compensating process during the period from time t4 to time t6.

To prevent the occurrence of such situations, the engine control unit 110 executes a retarding process that terminates the deactivating process and performs the first fuel injection through direct injection with the single-shot injection to restart supplying fuel to the deactivated cylinder. In this case, even if the engine 10 is in an operating state in which the multi-shot injection would be normally performed, the single-shot injection is executed. For example, even when the engine load factor KL is relatively high, the single-shot injection is executed.

For port injection, fuel injection needs to be completed during the intake stroke (i.e., by the time the intake valve 18 closes). For direct injection, fuel can be supplied to the cylinders even in the compression stroke after the intake valve 18 closes. Thus, by executing the first fuel injection through direct injection, the timing at which it was determined to restart supplying fuel to the deactivated cylinder is prevented from being later than the fuel injection start timing of the deactivated cylinder.

Figure 4:
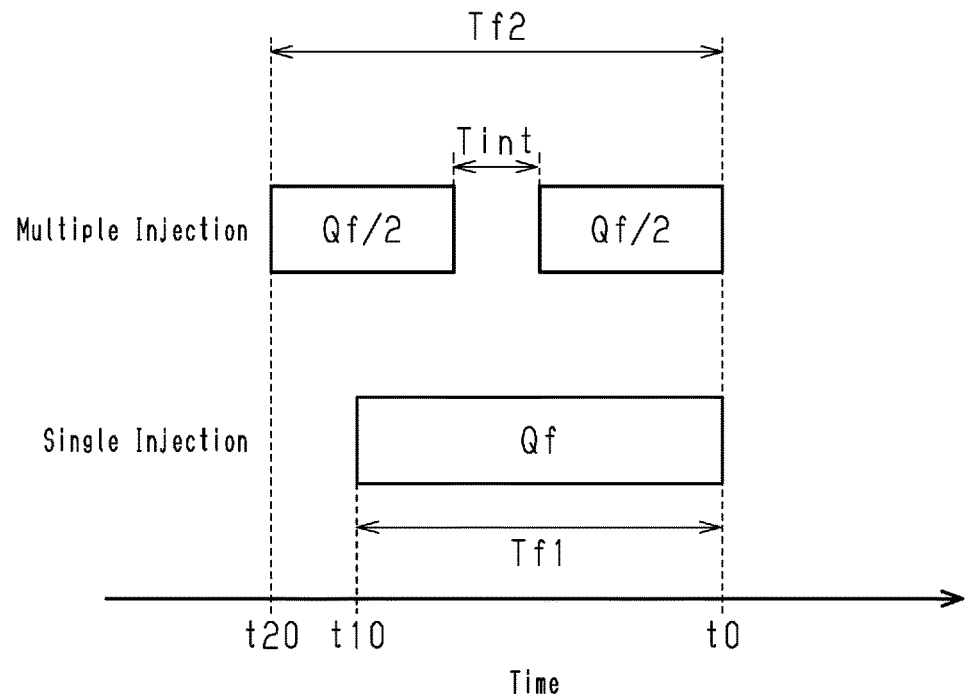
FIG. 4 is a diagram illustrating the comparison between the fuel injection start timing in the multi-shot injection and the fuel injection start timing in the single-shot injection.

However, as shown in FIG. 4, when direct injection is performed with the multi-shot injection, there is a suspension period Tint during which the injection is suspended between the split injections. Thus, the multi-shot injection takes a longer period of time to inject the same amount of fuel than the single-shot injection.

FIG. 4 shows the comparison between the multi-shot injection and the single-shot injection as to the period needed for the same requested injection amount Qf of fuel to be injected by time t0. In the multi-shot injection of FIG. 4, the requested injection amount Qf is equally divided to perform two injections. As shown in FIG. 4, the execution of the multi-shot injection provides the suspension period Tint, during which the injection is suspended between the two injections. Thus, a period Tf2 during which fuel is injected by the requested injection amount Qf through the multi-shot injection is longer than a period Tf1 during which fuel is injected by the requested injection amount Qf through the single-shot injection. The period Tf2 is an injection period of the multi-shot injection. The period Tf1 is an injection period of the single-shot injection. The start timing of the injection period is the fuel injection start timing. For the requested injection amount Qf of fuel to be fully injected by time t0, the fuel injection needs to be started at the fuel injection start timing. As shown in FIG. 4, the fuel injection start timing of the single-shot injection is time t10, and the fuel injection start timing of the multi-shot injection is time t20. That is, to prevent the timing at which it was determined to restart supplying fuel to the deactivated cylinder from being later than the fuel injection start timing of the deactivated cylinder, it is advantageous to select the single-shot injection so that the fuel injection start timing is maximally retarded.

The retarding process is a process that performs the first fuel injection through the single-shot injection to restart supplying fuel to the deactivated cylinder and retards the fuel injection start timing as compared to when the multi-shot injection is performed.

Retarding Process

When executing the deactivating process in the process of S22 in FIG. 2, the engine control unit 110 of the present embodiment sets the fuel injection modes of all the cylinders to direct injection as part of the retarding process. Accordingly, setting the fuel injection mode during the deactivating process to direct injection retards the fuel injection start timing of the first fuel injection in the deactivated cylinder as compared to when port injection is performed.

Figure 5:
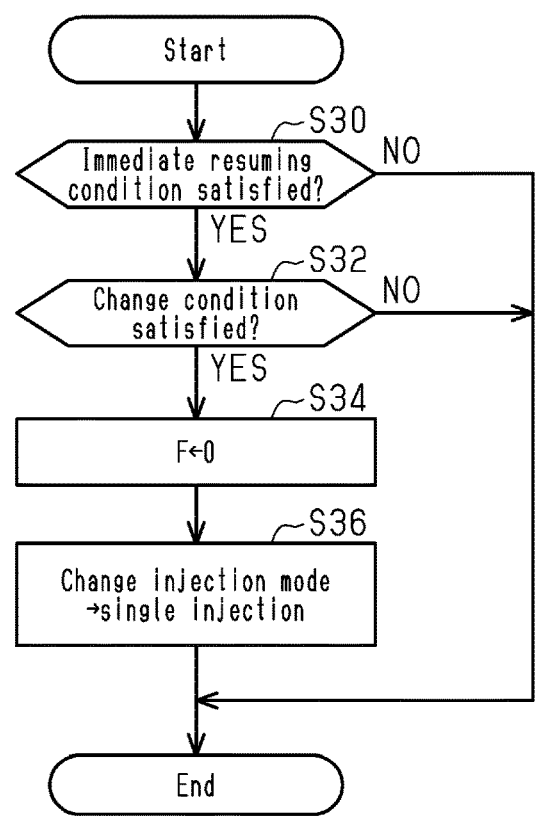
FIG. 5 is a flowchart illustrating the flow of processes in a routine executed by the engine control unit during the execution of the deactivating process.

By repeatedly executing the routine of FIG. 5 during the execution of the deactivating process, the engine control unit 110 further retards the fuel injection start timing of the first fuel injection to restart supplying fuel to the deactivated cylinder.

When the routine of FIG. 5 starts, the engine control unit 110 determines whether an immediate resuming condition is satisfied (S30). When determining that the immediate resuming condition is satisfied in the process of S30 (S30: YES), the engine control unit 110 advances the process to step S32.

The immediate resuming condition is that at least one of the following conditions (4) to (6) is satisfied.

Condition (4): The catalyst temperature is greater than or equal to the first specified temperature TH1.

Condition (5): The deposition amount DPM is greater than or equal to a specified amount D1, which is greater than the deactivation threshold value DPML, and the GPF temperature is greater than or equal to a second specified temperature TH2, which is lower than the first specified temperature TH1.

Condition (6): The engine 10 is diagnosed as having an anomaly.

Specifically, in the same manner as the example described with reference to FIG. 3, the engine control unit 110 protects the three-way catalyst 32 by terminating the deactivating process when the catalyst temperature is greater than or equal to the first specified temperature TH1.

If the supply of oxygen continues with a relatively large amount of particulate matter deposited in the GPF 34, heat of combustion causes the particulate matter to burn in a successive manner, thereby overheating the GPF 34. To solve this problem, the engine control unit 110 terminates the deactivating process when the deposition amount DPM is greater than or equal to the specified amount D1 and the GPF temperature is greater than or equal to the second specified temperature TH2. In this manner, the engine control unit 110 protects the GPF 34.

When the engine 10 (e.g., upstream temperature sensor 87) has an anomaly, the catalyst temperature cannot be accurately estimated. Thus, the deactivating process may be unable to be properly terminated based on the estimated catalyst temperature. To solve this problem, when the engine 10 is diagnosed as having an anomaly, the deactivating process is terminated at that point in time.

Next, the engine control unit 110 determines whether a change condition for changing the injection mode is satisfied (S32). When determining that the change condition is satisfied in the process of S32 (S32: YES), the engine control unit 110 changes the flag F from 1 to 0 and terminates the deactivating process (S34).

The change condition is that at least one of the following conditions (7) and (8) is satisfied.

Condition (7): The counter CNT is less than or equal to a first threshold value.

Condition (8): The counter CNT is less than or equal to a second threshold value.

The first threshold value is used to determine that injection with a requested amount cannot be performed even if the retarding process is executed, based on the counter CNT being greater than the first threshold value. That is, the condition (7) is used to determine whether the delay in the resuming of normal combustion operation can be canceled by executing the retarding process.

The second threshold value is used to determine that the time at which normal combustion operation resumes cannot synchronize with the time at which the torque compensating process is terminated, based on the counter CNT being greater than the second threshold value. The torque compensating process is terminated by the motor control unit 130 that has received a command from the engine control unit 110. When the command is sent from the engine control unit 110 to the motor control unit 130, a slight communication delay occurs. Further, the time for the motor control unit 130 that has received the command to perform calculation is needed. If the time at which normal combustion operation resumes is shifted from the time at which the torque compensating process is terminated, the variations in torque is more likely to occur. The higher the engine rotation speed NE, the shorter the period from when the immediate resuming condition is determined as being satisfied to when the torque compensating process is terminated. To solve this problem, the engine control unit 110 determines whether the counter CNT is less than or equal to the second threshold value, which is set based on the engine rotation speed NE, and determines whether the synchronization is possible. The higher the engine rotation speed NE, the smaller the second threshold value.

Specifically, when the delay in the resuming of normal combustion operation can be canceled by executing the retarding process and the time at which normal combustion operation resumes can synchronize with the time at which the torque compensating process is terminated, the change condition is satisfied.

After terminating the deactivating process in the process of S34, the engine control unit 110 changes the injection mode to the single-shot injection (S36). In this step, the fuel injection start timing of the first fuel injection, at which the supply of fuel to the deactivated cylinder is restarted, is retarded from the fuel injection start timing of a cylinder other than the deactivated cylinder. For example, the engine control unit 110 retards the fuel injection start timing of the deactivated cylinder to be most retarded within a range in which the amount of fuel needed to restart combustion can be fully injected. That is, the fuel injection start timing of the deactivated cylinder, at which the supply of fuel is to be restarted, is retarded from the fuel injection start timing of direct injection performed through a normal single-shot injection. The fuel injection start timing of the cylinder other than the deactivated cylinder corresponds to the fuel injection start timing of the direct injection performed through the normal single-shot injection. After executing the process of S36, the engine control unit 110 terminates the routine.

When determining in the process of S30 that the immediate resuming condition is not satisfied (S30: NO), the engine control unit 110 temporarily ends the routine without executing the process of S34 or S36. When determining in the process of S32 that the change condition is not satisfied (S32: NO), the engine control unit 110 temporarily ends the routine without executing the process of S34 or S36.

In this manner, when the immediate resuming condition and the change condition are satisfied during the execution of the deactivating process, the engine control unit 110 changes the injection mode to the single-shot injection and retards the fuel injection start timing of the deactivated cylinder from the fuel injection start timing of the cylinder other than the deactivated cylinder.

When the supplied fuel is burned through the single-shot injection and normal combustion operation has resumed, the engine control unit 110 returns the fuel injection mode to that of the normal combustion operation.

Operation of Present Embodiment

Figure 6:
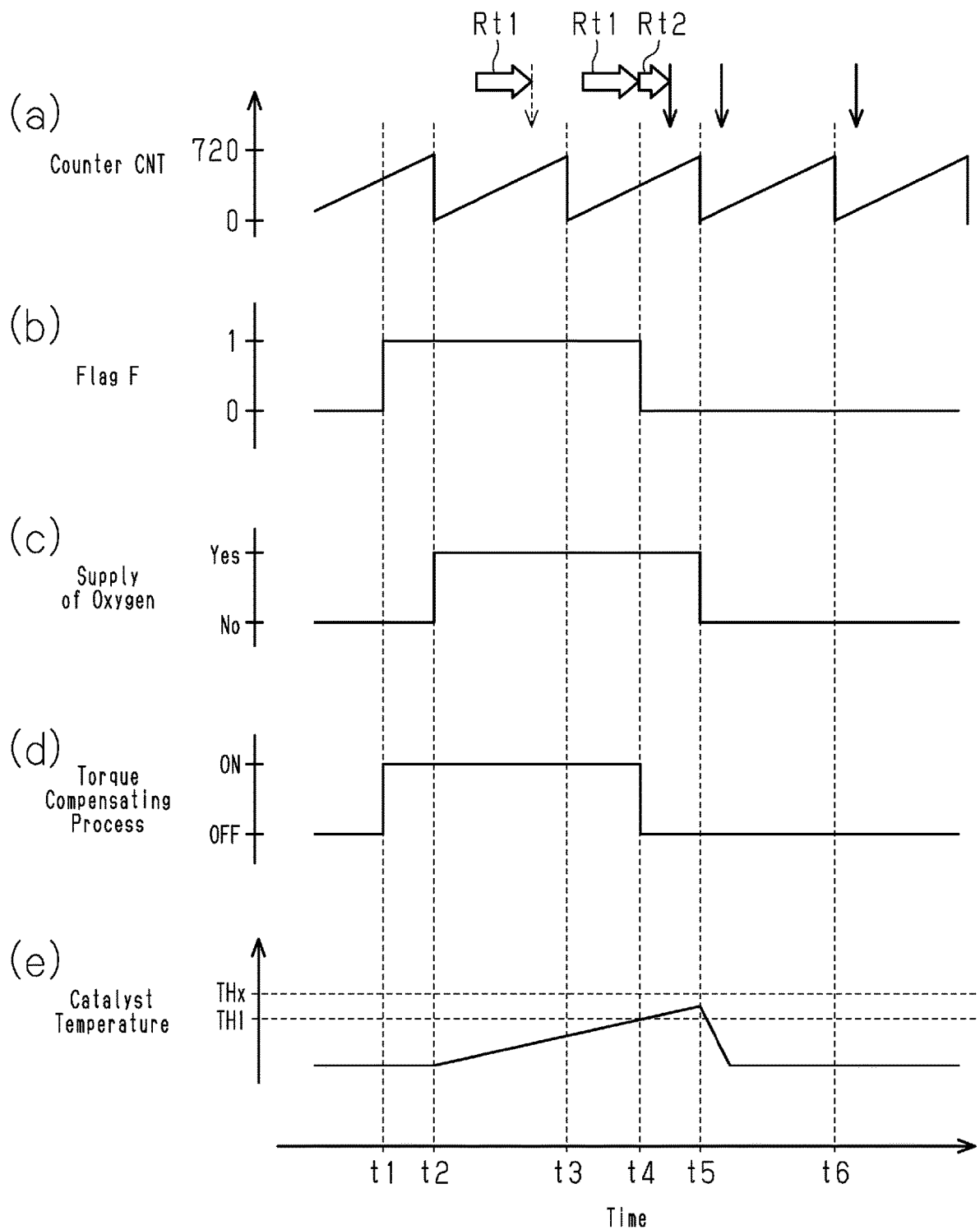
FIG. 6 is a timing diagram illustrating changes in each state that occur in a case in which the engine control unit of the present embodiment terminates the deactivating process when the immediate resuming condition is satisfied, in which section (a) illustrates changes in the counter CNT, section (b) illustrates changes in the flag F, section (c) illustrates changes in the supply of oxygen, section (d) illustrates changes in the torque compensating process, and section (e) illustrates changes in the catalyst temperature.

The operation of the engine control unit 110 will now be described with reference to FIG. 6. FIG. 6 illustrates an example in which the engine control unit 110 terminates the deactivating process in a situation similar to that described with reference to FIG. 3.

As illustrated in section (b) of FIG. 6, at time t1, the flag F is updated from 0 to 1 to start the deactivating process. As described above, when executing the deactivating process, the engine control unit 110 sets the fuel injection modes of all the cylinders to direct injection as part of the retarding process. Thus, even if the engine is operating in a state in which port injection would be normally executed, the fuel injection mode is changed to direct injection after the deactivating process starts.

Section (a) of FIG. 6 illustrates changes in the counter CNT, which indicates the crank angle of the deactivated cylinder. The downward arrows each indicate the fuel injection start timing of direct injection. The solid arrows each indicate that fuel is injected. The broken arrows each indicate that the supply of fuel is stopped by the deactivating process. As shown by the blank arrow Rt1 in section (a) of FIG. 6, a change in the fuel injection mode resulting from the execution of the deactivating process retards the fuel injection start timing as compared to the port injection illustrated in FIG. 3.

As illustrated in section (b) of FIG. 6, at time t1, the flag F is updated to 1 to start the deactivating process. This causes the torque compensating process to be started from time t1 as illustrated in section (d) of FIG. 6.

Since the deactivating process is started at time t1, ignition in the deactivated cylinder will not be performed during the period from time t2 to time t3. Thus, the air-fuel mixture produced by the fuel injected prior to time t1 is left unburned and discharged to the exhaust passage 30. This starts the supply of oxygen in the period from time t2 as illustrated in section (c) of FIG. 6. After the supply of oxygen is started, the catalyst temperature starts to rise as illustrated in section (e) of FIG. 6.

As illustrated in section (e) of FIG. 6, the catalyst temperature reaches the first specified temperature TH1 at time t4. That is, it is determined that the immediate resuming condition and the change condition are satisfied at time t4. Then, as illustrated in section (b) of FIG. 6, the flag F is changed from 1 to 0 to terminate the deactivating process at time t4.

As described above, the engine control unit 110 executes the process of S36 to change the injection mode to the single-shot injection and retards the fuel injection start timing of the deactivated cylinder. Thus, as shown by the blank arrow Rt2 in section (a) of FIG. 6, the fuel injection start timing of the deactivated cylinder is further retarded.

The fuel injection start timing retarded in this manner is later than time t4. This allows the engine control unit 110 to supply fuel to the deactivated cylinder during the period from time t3 to time t5. By supplying fuel through direct injection with the retarded timing, combustion operation resumes in the combustion stroke of the period from time t5. Accordingly, as illustrated in section (c) of FIG. 6, oxygen is not supplied in the period from time t5 in this vehicle.

As illustrated in section (e) of FIG. 6, the catalyst temperature stops rising and decreases from time t5. This avoids situations in which the catalyst temperature reaches the limit temperature THx. As a result, overheating of the three-way catalyst 32 is prevented.

Additionally, combustion operation resumes in the deactivated cylinder in the period from time t5. Thus, as compared to the example described with reference to FIG. 3, the period during which torque cannot be compensated for by the torque compensating process is shortened. Thus, the torque compensating process is terminated in the period during which normal combustion operation resumes from time t5. That is, the time at which normal combustion operation resumes can synchronize with the time at which the torque compensating process is terminated.

Advantages of Present Embodiment (1) By executing the retarding process, the engine control unit 110 executes, through direct injection by the single-shot injection, the first fuel injection in the deactivated cylinder when restarting the supply of fuel. The engine control unit 110 executes the retarding process to retard the fuel injection start timing of the first fuel injection in the deactivated cylinder as compared to when direct injection is performed with the multi-shot injection. This prevents the timing at which the deactivating process was terminated and it was determined to restart supplying fuel to the deactivated cylinder, in which the supply of fuel was stopped, from being later than the fuel injection start timing of the deactivated cylinder. Accordingly, when terminating the deactivating process, the engine control unit 110 allows for quick resuming of normal operation in which combustion is performed in all the cylinders.

(2) If the fuel injection modes of multiple cylinders are individually controlled, fuel injection would be controlled in a complicated manner. In this regard, the engine control unit 110 can execute the retarding process. In the retarding process, the fuel injection modes of all the cylinders in which the deactivating process is being executed are changed to direct injection with the single-shot injection, thereby performing the first fuel injection through direct injection with the single-shot injection in the deactivated cylinder. This allows the retarding process to be executed with a less complicated fuel injection control.

(3) As the fuel injection start timing is set to be more retarded, the timing at which it was determined to restart supplying fuel to the deactivated cylinder is prevented from being later than the fuel injection start timing of the deactivated cylinder. That is, as the fuel injection start timing is set to be more retarded, resumption of normal operation is prevented from being delayed. However, since there is a fuel injection start timing suitable for combustion, unnecessary retardation of the fuel injection start timing is not preferred. In this regard, the engine control unit 110 retards only the fuel injection start timing of the first fuel injection to restart supplying fuel to the deactivated cylinder from the fuel injection start timing of a cylinder other than the deactivated cylinder in the process of S36. This prevents the resumption of normal operation from being delayed, while maximally performing fuel injection at a time suitable for combustion.

(4) The immediate resuming condition includes condition (4). That is, the engine control unit 110 executes the retarding process to terminate the deactivating process when determining that the temperature of the three-way catalyst 32 (exhaust purifying device) is greater than or equal to the first specified temperature TH1 during the execution of the deactivating process.

During the execution of the deactivating process, the oxygen that has passed through the deactivated cylinder is supplied to the three-way catalyst 32 through the exhaust passage 30. This expedites the oxidation in the three-way catalyst 32, thereby increasing the temperature of the three-way catalyst 32. To prevent overheating of the three-way catalyst 32, the supply of oxygen to the three-way catalyst 32 needs to be stopped by terminating the deactivating process when the temperature of the three-way catalyst 32 is greater than or equal to a specified temperature. However, if the resumption of normal operation is delayed as in the example of FIG. 3, the supply of oxygen continues so that the three-way catalyst 32 is overheated. Such overheating of the three-way catalyst 32 is prevented by the engine control unit 110.

(5) The immediate resuming condition includes condition (5). The engine control unit 110 executes the retarding process to terminate the deactivating process when determining that the deposition amount DPM is greater than or equal to the specified amount D1 and the GPF temperature is greater than or equal to the second specified temperature TH2 during the execution of the deactivating process.

During the execution of the deactivating process, the oxygen that has passed through the deactivated cylinder is supplied to the GPF 34 through the exhaust passage 30. Thus, the combustion of particulate matter deposited in the GPF 34 increases the temperature of the GPF 34. If the supply of oxygen continues with a relatively large amount of particulate matter deposited in the GPF 34, heat of combustion causes the particulate matter to burn in a successive manner, thereby overheating the GPF 34. To prevent overheating of the GPF 34, the supply of oxygen to the GPF 34 needs to be stopped by terminating the deactivating process when the GPF temperature is greater than or equal to the second specified temperature TH2 in a state in which the deposition amount DPM is greater than or equal to the specified amount D1. However, if the resumption of normal operation is delayed, the supply of oxygen continues so that the GPF 34 is overheated. Such overheating of the GPF 34 is prevented by the engine control unit 110.

(6) The engine control unit 110 prevents the resumption of combustion operation from being delayed with respect to the timing in which the torque compensating process is stopped. This reduces the variations in torque.

Modifications

The present embodiment may be modified as follows. The present embodiment and the following modifications can be combined as long as they remain technically consistent with each other.

In the above embodiment, the fuel injection modes of all the cylinders are changed to direct injection in the process of S22 as part of the retarding process. Instead, the engine control unit 110 may change only the fuel injection mode of the deactivated cylinder to direct injection in the process of S22. In this case, the fuel injection start timing of the first fuel injection to terminate the deactivating process is delayed in the same manner as the above embodiment.

Instead of changing the fuel injection mode to direct injection in the process of S22, the fuel injection mode may be changed to direct injection and the fuel injection start timing may be retarded when the immediate resuming condition and the change condition are satisfied. That is, the fuel injection mode may be changed to direct injection with the single-shot injection and the fuel injection start timing may be retarded in the process of S36.

Figure 7:
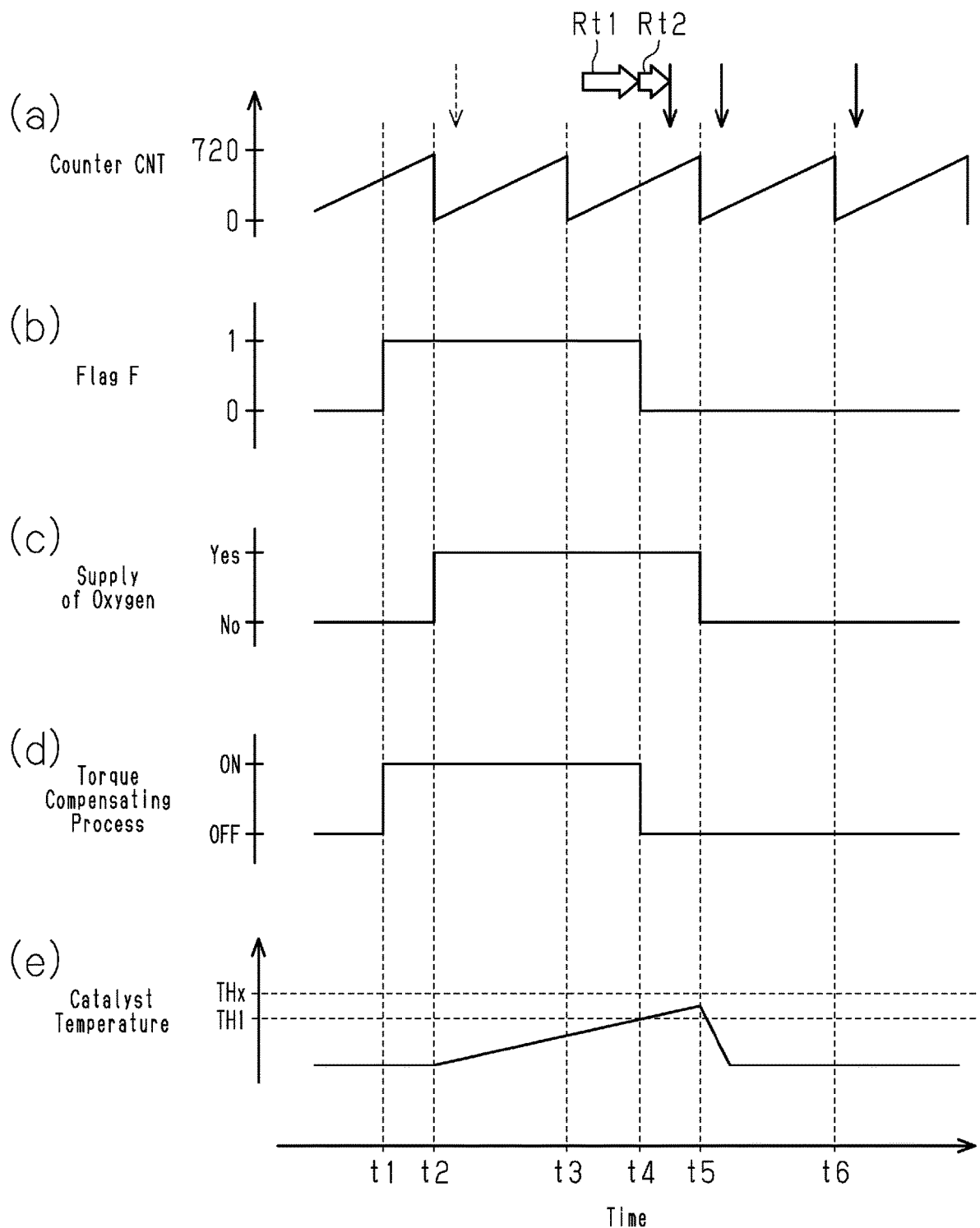
FIG. 7 is a timing diagram illustrating changes in each state that occur in a case in which the engine control unit according to a modification terminates the deactivating process when the immediate resuming condition is satisfied, in which section (a) illustrates changes in the counter CNT, section (b) illustrates changes in the flag F, section (c) illustrates changes in the supply of oxygen, section (d) illustrates changes in the torque compensating process, and section (e) illustrates changes in the catalyst temperature.

FIG. 7 illustrates an example of changing the fuel injection mode of the deactivated cylinder and retarding the fuel injection start timing when it is determined to terminate the deactivating process so that normal combustion operation resumes. FIG. 7 is a timing diagram illustrating changes in each state that occur in a case in which the engine control unit 110 according to a modification terminates the deactivating process when the immediate resuming condition and the change condition are satisfied. Sections (a), (b), (c), (d), and (e) of FIG. 7 respectively illustrate changes in the counter CNT, changes in the flag F, changes in the supply of oxygen, changes in the torque compensating process, and changes in the catalyst temperature. In this case, as illustrated in section (a) of FIG. 7, the fuel injection start timing during the period from time t2 to time t3 corresponds to the timing of fuel injection through port injection. However, in this case, when the deactivating process is stopped at time t4, change to direct injection with the single-shot injection and retardation of the fuel injection start timing are executed simultaneously. This allows combustion operation to resume in the period from time t5.

In the above embodiment, the engine control unit 110 can only change the injection modes of all the cylinders collectively. Instead, the fuel injection modes of the four cylinders may be controlled individually. At least the injection mode of the deactivated cylinder may be changed to the single-shot injection.

In this case, the retarding process may be a process that changes, to fuel injection through the single-shot injection, only the first fuel injection when terminating the deactivating process to restart supplying fuel to the deactivated cylinder, in which the supply of fuel is stopped.

Since there is a fuel injection mode suitable for combustion, an unnecessary change to the fuel injection mode is not preferred. In this regard, like the above configuration, only the first fuel injection to restart supplying fuel to the deactivated cylinder is changed to direct injection with the single-shot injection. This prevents the resumption of normal operation from being delayed, while maximally performing fuel injection in the fuel injection mode suitable for combustion.

In the above embodiment, when it is determined that the immediate resuming condition and the change condition are satisfied, the injection mode is changed. When fuel injection is performed for a cylinder other than the deactivated cylinder, normal combustion operation resumes. Accordingly, virtually only the fuel injection for the deactivated cylinder is performed through the single-shot injection.

The condition that permits the execution of the regenerating process is not limited to those in the above embodiment. For example, only one or two of the above three conditions (1) to (3) may be included. Alternatively, the predetermined condition may include a condition other than the three conditions. As another option, the predetermined condition does not have to include any one of the three conditions.

The purpose of executing the deactivating process to supply oxygen is not limited to the regenerating process. For example, the retarding process of above embodiment may be executed in the engine 10 in which the deactivating process is executed to warm up the three-way catalyst 32.

The process that estimates the deposition amount DPM is not limited to the one illustrated in FIG. 2. Instead, for example, the deposition amount DPM may be estimated using the intake air amount Ga and the pressure difference between the upstream side and the downstream side of the GPF 34. Specifically, the deposition amount DPM is estimated to be a larger value when the pressure difference is relatively large than when the pressure difference is relatively small. Even when the pressure difference is the same, the deposition amount DPM is estimated to be a larger value when the intake air amount Ga is relatively small than when the intake air amount Ga is relatively large. If the pressure in the downstream side of the GPF 34 is regarded as a fixed value, the pressure Pex may be used instead of the differential pressure.

The arrangement of the three-way catalyst 32 and the GPF 34 of the exhaust passage 30 is not limited to the one in which the GPF 34 is located upstream of the three-way catalyst 32.

The GPF 34 is not limited to the filter supported by the three-way catalyst and may be only the filter. Further, the GPF 34 does not have to be located downstream of the three-way catalyst 32 in the exhaust passage 30. Furthermore, the GPF 34 does not have to be included. For example, even when an aftertreatment device includes only the three-way catalyst 32, the deactivating process may be executed to warm up the three-way catalyst 32.

A vehicle in which the torque compensating process of S24 may be employed.

The deactivating process of S22 does not have to include enriching the air-fuel ratio in a cylinder other than the deactivated cylinder. For example, in the regenerating process for the GPF 34, if oxygen is supplied at a sufficiently high GPF temperature and particulate matter can burn, the combustion can be continued so that the regeneration can progress without enriching the air-fuel ratio in the deactivating process.

In the above embodiment, the engine control unit 110 controls the engine 10 including the port injection valves 16 and the direct injection valves 22. Instead, a configuration similar to that of the above embodiment may be employed in the engine 10 including only the port injection valves 16. Alternatively, a configuration similar to that of the above embodiment may be employed in the engine 10 including only the direct injection valves 22.

Specifically, when terminating the deactivating process and restarting the supply of fuel to the deactivated cylinder in which supply of fuel is stopped, the retarding process is executed to perform the first fuel injection through the single-shot injection and retard the fuel injection start timing as compared to when executing the multi-shot injection. Thus, in the same manner as the above embodiment, the timing at which the deactivating process was terminated and it was determined to restart supplying fuel to the deactivated cylinder, in which the supply of fuel was stopped, is prevented from being later than the fuel injection start timing of the deactivated cylinder.

The engine control unit 110 is not limited to a unit that includes processing circuitry and a memory and executes software processing. For example, at least part of the processes executed by the software in the above-described embodiments may be executed by hardware circuits (such as ASIC) dedicated to executing these processes. That is, the engine control unit 110 may be modified as long as it has any one of the following configurations (a) to (c): (a) a configuration including a processor that executes all of the above processes according to programs and a program storage device such as a ROM that stores the programs; (b) a configuration including a processor and a program storage device that execute part of the above processes according to the programs and a dedicated hardware circuit that executes the remaining processes; and (c) a configuration including a dedicated hardware circuit that executes all of the above-described processes. Multiple software executing devices each including a processor and a program storage device and multiple dedicated hardware circuits may be provided.

The vehicle is not limited to a series-parallel hybrid electric vehicle and may be, for example, a parallel hybrid electric vehicle or a series hybrid electric vehicle. The hybrid vehicle may be replaced with, for example, a vehicle in which only the engine 10 is used as a power generation device for the vehicle.

In the above example, the engine 10 is a straight-four engine, which includes four cylinders. However, the engine 10 controlled by the engine control unit 110 is not limited to a straight-four engine. That is, the engine 10 is not limited to a four-cylinder engine. The engine 10 may be a V engine, a W engine, or a horizontally opposed engine, in which each bank includes an exhaust purifying device. In this case, the deactivating process is designed to stop the supply of fuel to at least one of the cylinders in each of the banks in one cycle. This configuration allows a sufficient amount of oxygen to be delivered to the exhaust purifying device of each bank of the V engine or the like.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to control an internal combustion engine, the internal combustion engine being configured to execute multi-shot injection in which injection of fuel by an amount requested in a single combustion cycle is split into two or more injections with a time of suspension between each of the two or more injections and single-shot injection in which fuel is injected once by the amount requested in the single combustion cycle, and the internal combustion engine being configured to execute a deactivating process that stops supplying fuel to at least one of cylinders and supplies fuel to the remaining cylinders, the controller being configured to execute, when terminating the deactivating process to restart supplying fuel to a deactivated cylinder in which supply of fuel is stopped, a retarding process that executes a first fuel injection through the single-shot injection so that a fuel injection start timing is retarded by an amount of time that equals a sum of the time of suspension during the multi-shot injection when injecting fuel by the amount requested in the single combustion cycle.

2. The controller according to claim 1, wherein the retarding process includes changing fuel injection modes in all the cylinders in which the deactivating process is being executed to the single-shot injection.

3. The controller according to claim 2, wherein the retarding process includes retards, from a fuel injection start timing of a cylinder other than the deactivated cylinder, the fuel injection start timing of the first fuel injection to restart supplying fuel to the deactivated cylinder.

4. The controller according to claim 1, wherein the retarding process includes changing, to the single-shot injection, only the first fuel injection when terminating the deactivating process to restart supplying fuel to the deactivated cylinder in which the supply of fuel is stopped.

5. The controller according to claim 1, wherein
the internal combustion engine further includes an exhaust passage and an exhaust purifying device disposed in the exhaust passage, and
the controller is configured to execute the retarding process and terminate the deactivating process when determining that a temperature of the exhaust purifying device is greater than or equal to a specified temperature during execution of the deactivating process.

6. The controller according to claim 1, wherein
the internal combustion engine further includes an exhaust passage and a filter disposed in the exhaust passage, and
the controller is configured to execute the retarding process and terminate the deactivating process when determining that a deposition amount of particulate matter in the filter is greater than or equal to a specified amount and a temperature of the filter is greater than or equal to a specified temperature during execution of the deactivating process.

7. The controller according to claim 1, wherein
the internal combustion engine includes a port injection valve that injects fuel into an intake port and a direct injection valve that injects fuel into each of the cylinders,
the internal combustion engine is configured to execute port injection that is fuel injection performed by the port injection valve and direct injection that is fuel injection performed by the direct injection valve, and
the controller is configured to execute, when terminating the deactivating process to restart supplying fuel to the deactivated cylinder in which the supply of fuel is stopped, the retarding process that executes the first fuel injection through the direct injection with the single-shot injection and retards the fuel injection start timing as compared to when executing the direct injection with the multi-shot injection.

8. A method for controlling an internal combustion engine, the internal combustion engine being configured to execute multi-shot injection in which injection of fuel by an amount requested in a single combustion cycle is split into two or more injections with a time of suspension between each of the two or more injections and single-shot injection in which fuel is injected once by the amount requested in the single combustion cycle, and the internal combustion engine being configured to execute a deactivating process that stops supplying fuel to at least one of cylinders and supplies fuel to the remaining cylinders, the method comprising:

executing when terminating the deactivating process to restart supplying fuel to a deactivated cylinder in which supply of fuel is stopped, a first fuel injection through the single-shot injection so that a fuel injection start timing is retarded by an amount of time that equals a sum of the time of suspension during the multi-shot injection when injecting fuel by the amount requested in the single combustion cycle.

* * * * *